US012657194B2

(12) United States Patent     (10) Patent No.:   US 12,657,194 B2

Boxell et al.     (45) Date of Patent:   Jun. 16, 2026

(54) RANKING SEARCH QUERIES USING CONTEXTUAL RELEVANCE AND THIRD-PARTY FACTORS

(71) Applicant: Maplebear Inc., San Francisco, CA (US)

(72) Inventors: Levi Boxell, Brownsburg, IN (US); Esther Vasiete Allas, New York, NY (US); Tejaswi Tenneti, San Carlos, CA (US); Tilman Drerup, Palo Alto, CA (US); Yueyang Rao, Albany, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/367,185

(22) Filed: Sep. 12, 2023

(65) Prior Publication Data

US 2025/0086189 A1     Mar. 13, 2025

(51) Int. Cl.
    G06F 16/2457     (2019.01)
    G06F 16/248     (2019.01)

(52) U.S. Cl.
    CPC ...... G06F 16/24578 (2019.01); G06F 16/248 (2019.01)

(58) Field of Classification Search
    None
    See application file for complete search history.

(56) References Cited

U.S. PATENT DOCUMENTS

| | | | |
|---|---|---|---|
| 2013/0072233 A1* | 3/2013 | Sandholm ............... | H04W 4/02 |
| | | | 455/456.3 |
| 2015/0317317 A1* | 11/2015 | Deng ................ | G06F 16/24578 |
| | | | 707/748 |
| 2018/0107917 A1* | 4/2018 | Hewavitharana ... | G06F 16/2468 |
| 2018/0349513 A1* | 12/2018 | Hornkvist ......... | G06F 16/24578 |
| 2019/0108235 A1* | 4/2019 | Zheng ............... | G06F 16/24578 |
| 2019/0179917 A1* | 6/2019 | Agrawal ............. | G06F 16/9537 |
| 2021/0287271 A1* | 9/2021 | Prasad .................. | G06F 16/953 |

* cited by examiner

*Primary Examiner* — Dawaune A Conyers

(74) *Attorney, Agent, or Firm* — Fenwick & West LLP

(57)      ABSTRACT

A computer system allowing users to search for items of interest provides a search query interface. The system receives characters of a search query in the search interface as the user enters the characters and interactively calculates, ranks, and displays a set of possible search query options from which the user can select. To rank the set of possible search query options, the system modifies rankings of candidate search queries based on factors associated with third parties. More specifically, contextual relevance scores are computed for the candidate search queries based on the context, such as a user to whom the search results are provided. These contextual relevance scores are in turn adjusted using factors associated with third parties, such as values calculated based on consideration offered by third parties. Users are shown the search query options, ranked in order of the adjusted relevance scores, as possible query selections.

18 Claims, 4 Drawing Sheets

RANKING SEARCH QUERIES USING CONTEXTUAL RELEVANCE AND THIRD-PARTY FACTORS

BACKGROUND

Some software systems execute queries on behalf of users, and in particular may suggest full queries to the user that match a partial query as the user is entering it (e.g., suggesting "pineapple", "chunky pineapple", "pineapple slices", "pineapple juice", "tropical fruit", etc. in response to the user typing the partial query "pineap"). This helps the user by reducing the amount of time required to enter a query, and by (in some cases) suggesting more applicable queries than the user initially had in mind.

In such systems, the system should select and rank the possible search queries to best achieve the system's goal(s), such as providing the user with highly relevant queries (and, relatedly, search results that are obtained via the queries). Another possible goal, for systems in which third parties may provide consideration for the execution of certain queries, is to ensure that queries of the different possible third parties are systematically integrated into the ranking, rather than being ignored. It would be beneficial to take into account the various different possible goals when ranking the queries for the user.

SUMMARY

A computer system allowing users to search for items of interest provides a search interface in which the users can enter search queries. The system receives characters of a search query in the search interface as the user enters the characters and interactively calculates, ranks, and displays a set of possible search query options from which the user can select. To rank the set of possible search query options, the system modifies rankings of candidate search queries based on one or more factors associated with third parties. More specifically, contextual relevance scores are computed for the candidate search queries based on the context, such as a user who entered the search query. These contextual relevance scores are in turn adjusted using one or more factors associated with third parties, such as values calculated based on consideration offered by third parties for executing candidate search queries. Users are shown the search query options, ranked in order of the adjusted relevance scores, as possible query selections.

In some embodiments, the factors used to adjust the relevance scores include the amount of a third party's budget for providing consideration that remains unused. This tends to promote search queries for the execution of which third parties have specified a budget for a maximum amount of consideration to be provided, and where the budget has largely been unused.

DETAILED DESCRIPTION

Figure 1:
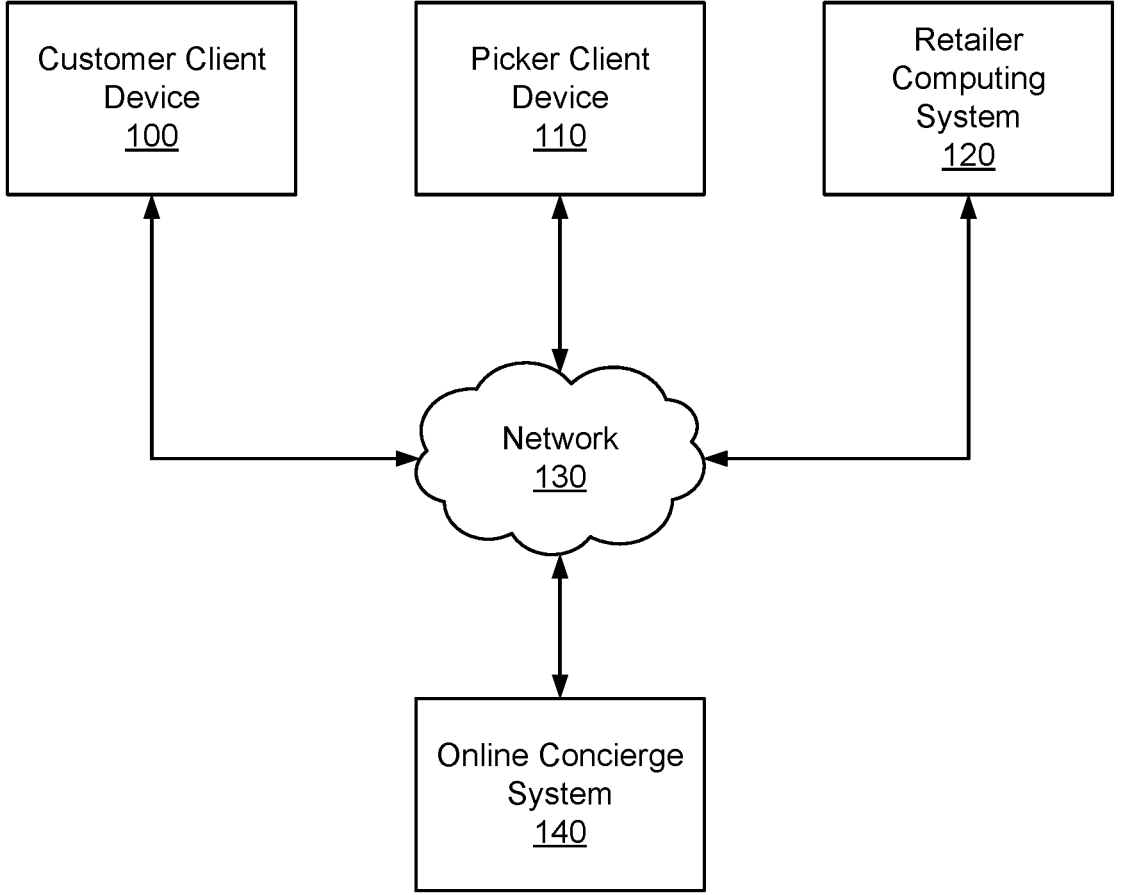
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected.

In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
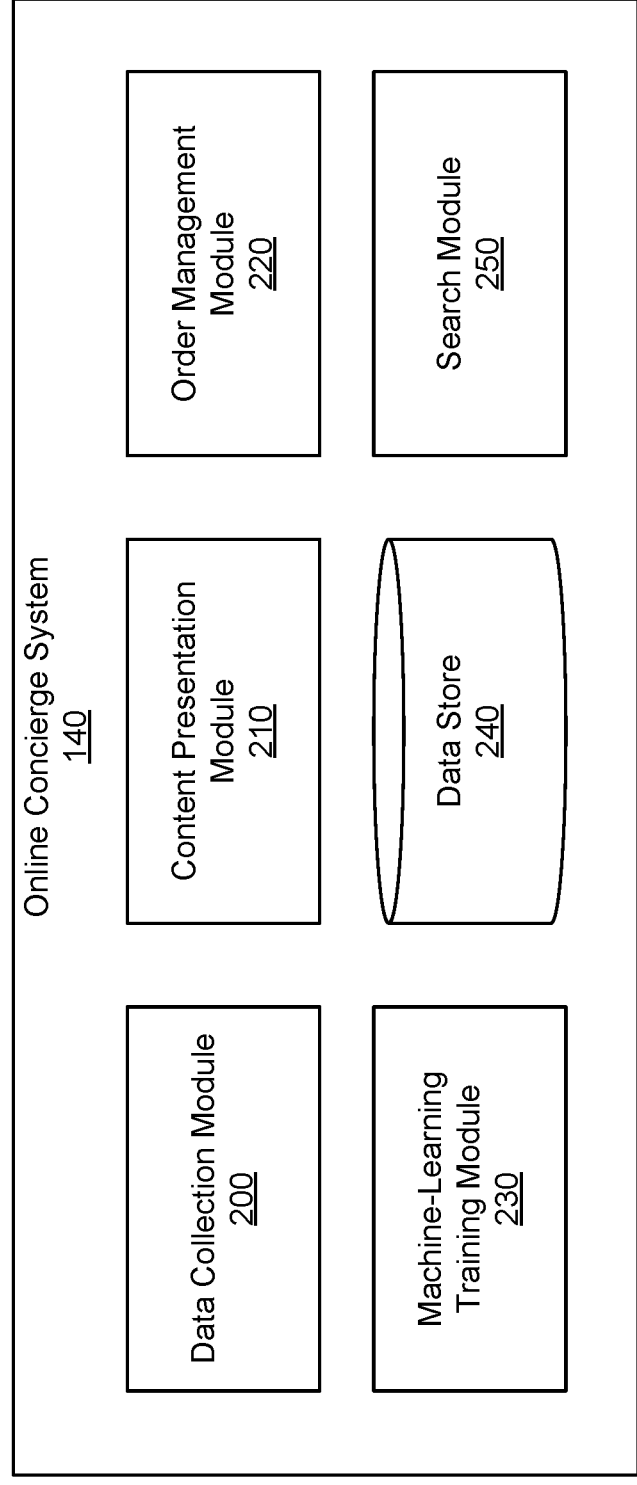
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The online concierge system 140 additionally includes a search module 250 that computes scores for the candidate search queries potentially to be suggested to users as they fill out a search user interface, and uses the computed scores to rank the candidates. Users can then select a search query from among the ranked candidates to initiate a search for items that match the search query text, resulting in the online concierge system 140 providing search results such as links for obtaining information about, or purchasing, the various items that may be obtained via the online concierge system 140 (e.g., a link to an item for a 16-ounce can of pineapple from a particular retailer). Third parties may also provide consideration to the online concierge system 140 when search queries that the third parties designate are executed.

Figure 3:
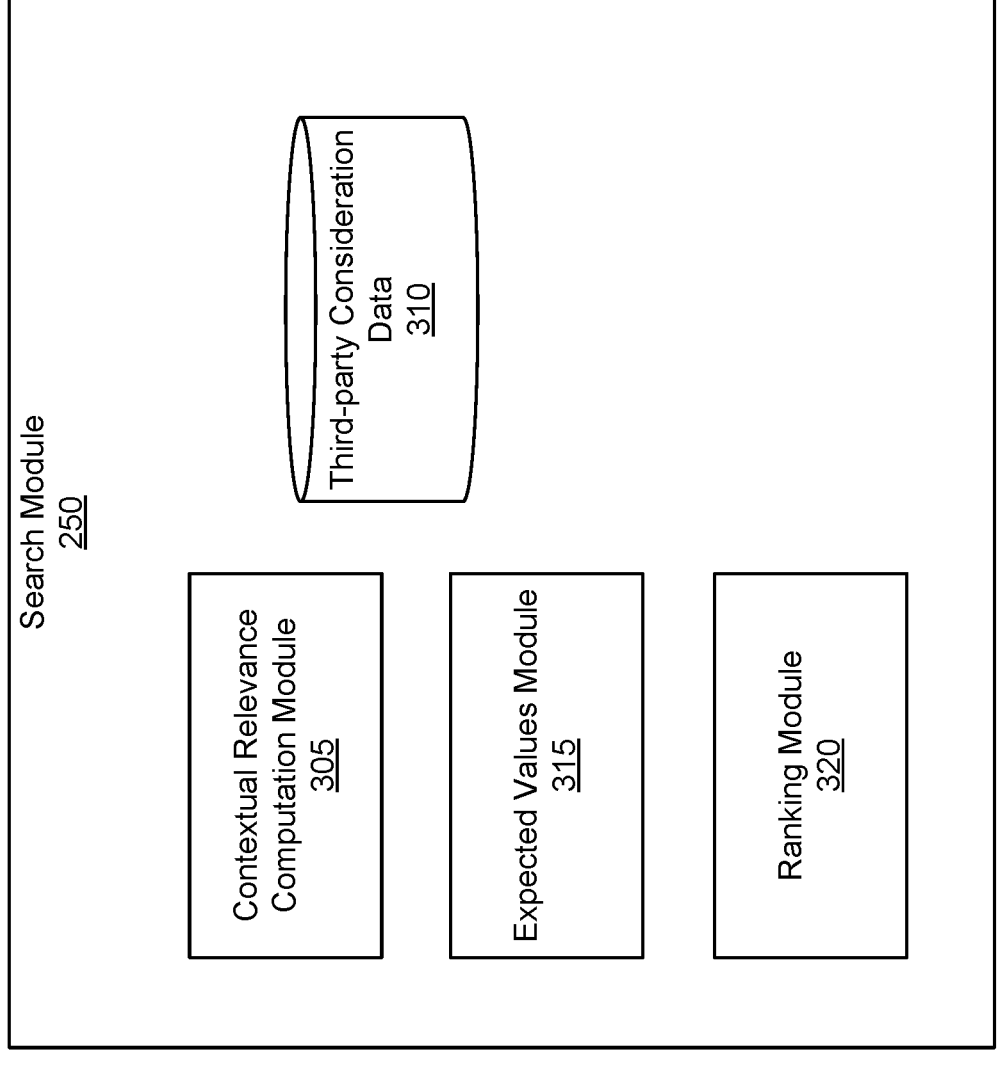
FIG. 3 illustrates components of the search module of FIG. 2, according to some embodiments.

FIG. 3 illustrates components of the search module 250 of FIG. 2, according to some embodiments.

The search module 250 includes a contextual relevance computation module 305 that computes relevance scores for candidate search queries according to the context in which user queries occur. ("Candidate" search queries for a particular partial query entered by a user are those satisfying the partial query, such as matching query text (e.g., the partial query "pineap" constituting a substring match for the full candidate search query "sliced pineapple"), or having a particular semantic relationship with the candidate search query (e.g., the query "pineapple" being a semantic instance of the broader category "tropical fruit"). Since there may be a large number of candidate search queries, only the best candidates are ultimately provided to the user.) The query context can include different factors in different embodiments, such as the user on whose behalf the query is issued. Factors related to the user can include the user's unique identifier within the online concierge system 140, and/or the items that the user has searched for, viewed, or purchased, etc. Another factor that may be used is the strength of the match between the user's partial query and the search query being scored, such as how much of their text is common, how strongly their semantic concepts are related, or the like. Yet another factor that may be used is any existing implicit search query, such as a prior query for "fruit" if the user is entering the search query after having previously browsed into the "fruit" category.

The search module 250 additionally includes a database of third-party consideration data 310, which includes data specified by third parties (such as the retailers of the items obtained via the online concierge system 140) about the conditions under which they will provide consideration to the online concierge system (such as for executing particular search queries), as well as the nature and amount of that consideration. For example, the third-party consideration data 310 might indicate that the XYZ Fruit Corporation will pay a monetary fee of 3 cents if the search query "XYZ pineapple" is executed.

The search module 250 additionally includes an expected values module 315 that computes an estimated amount of consideration that will result from the user selecting a particular search query. In some embodiments, the expected values module 315 computes the estimated value of the consideration for a particular search query by evaluating logged statistics over some prior time period (e.g., the last 14 days), evaluating how much consideration was obtained from third parties in cases where a particular search query did result in the online concierge system 140 receiving consideration. In some embodiments, the consideration is estimated as follows:

$$\text{consideration\_revenue\_per\_search}_{query} =$$
$$(\text{chargeable\_amount}_{query})/(\text{num\_searches}_{query} + \text{penalty})$$

where $\text{chargeable\_amount}_{query}$ represents the total amount of consideration that a third party specified in connection with a given search query, and $\text{num\_searches}_{query}$ represents how many searches for that query occurred over the prior time period in question and resulted in the obtaining of consideration. On the assumption that the number of searches is low and the number of terms is high, penalty may be set to a low value, such as 5. Penalty may also be dynamically computed using data generated by the online concierge system 140

In some embodiments, the expected values module 315 additionally computes expected gross merchandise value (GMV) (that is, the total value of items purchased in response to execution of the search query) of the various possible search queries. As with an estimated value of consideration, the expected GMV can be computed by evaluating logged statistics over a prior time period, identifying items that were purchased by users after the execution of a particular search query, identifying the value (e.g., prices) of the purchased items, and computing the average total value therefrom (e.g., by dividing the total value of items purchased by the number of instances of that particular search query leading to those purchases).

In some embodiments, rather than directly computing and storing fixed values for the estimated amount of consideration and/or expected GMV, the expected values module 315 trains a model (e.g., a neural network) based on the logged statistics, and the model outputs expected values at runtime given the runtime context features. Features for the model training and evaluation can include user identifier, day and time, prior user item views and/or purchases, search query text, and the like.

The search module 250 additionally includes a ranking module 320 that ranks the various candidate search queries according to hybrid scores that in different embodiments are a function of contextual relevance, estimated consideration, expected GMV, and/or the amount of remaining third party budget. This has the effect of adjusting the contextual relevance score to produce the final ranking score. In one such embodiment, the ranking module 320 computes a hybrid score as a function of both expected GMV and an estimated consideration value, as well as the original relevance score. For example, in some embodiments the ranking score is calculated as:

$$ranking\_score = relevance\_score *$$
$$((1 + gmv\_per\_search)^{\alpha}) * ((1 + consideration\_per\_search)^{\beta})$$

where relevance_score is the score computed by the contextual relevance computation module 305, and gmv_per_search and consideration_per_search are respectively the expected GMV for the search and the estimated amount of consideration for the search, as determined by the expected values module 315. The $\alpha$ parameter need not be a fixed value, and in some embodiments is computed based on factors such as the length of the entered partial search query relative to the length of the search query being evaluated (e.g., if the user entered the partial query "pineap", and the search query being evaluated is "chunky pineapple", then the relative length is len("pineap")/len("chunky pineapple")=6/16=0.375), the degree of price-consciousness of the user (with higher degrees causing a to be lower). The $\beta$ parameter may be calibrated to balance various business objectives (e.g., maximizing GMV, or maximizing usage of allocated budget) given logged data. In some embodiments, the $\alpha$ and $\beta$ parameters can be adjusted using a "multi-armed bandit" or "contextual bandit" technique to find optimal parameter values to balance the business objectives.

In other embodiments, the ranking score takes into account the amount of a third party's budget for providing consideration that remains unused. This tends to promote search queries for the execution of which third parties have specified a budget for a maximum amount of consideration to be provided, and where the budget has largely been unused. In some such embodiments, the ranking score is calculated as:

$$ranking\_score =$$
$$relevance\_score * ((1 + gmv\_per\_search))^{\alpha} * ((1 + cons\_adjustement)^{\gamma})$$

In turn, cons_adjustment may be calculated as:

$$cons\_adjustment =$$
$$\frac{ln(min(remaining\_cons\_budget, MAX\_DAILY\_SPEND)) *}{ln(1 + min(consideration\_per\_search, 1))}$$

where remaining_cons_budget is the unused amount of the budgeted consideration of the third party, MAX_DAILY_SPEND is the maximum amount that a third party is expected to spend over the budget period, and the min( ) functions respectively set expected limits on spending and search revenue. The $\gamma$ parameter may be computed as a function of g, such as a linear function (e.g., $\gamma = \alpha * 0.25 + 0.05$) When computing cons_adjustment, it may be aggregated across the different third parties providing consideration.

Figure 4:
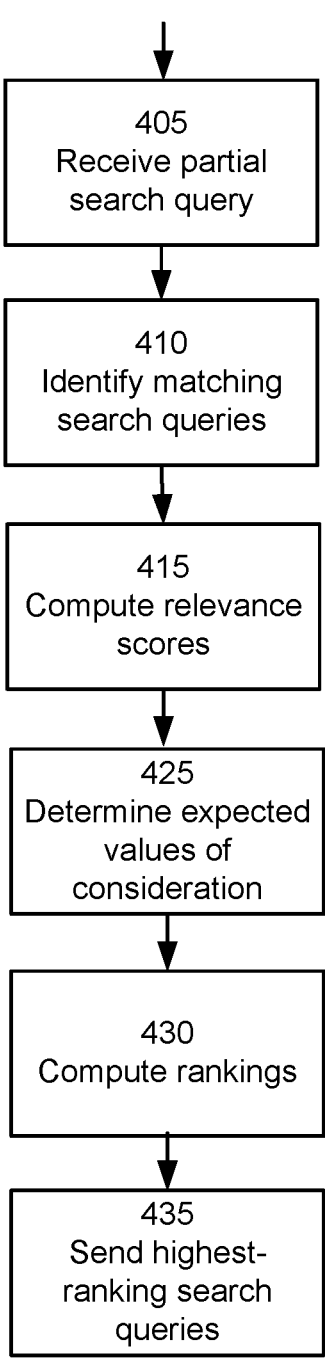
FIG. 4 is a flowchart of steps for identifying and providing suggested search queries to a user, according to some embodiments.

FIG. 4 is a flowchart of steps for identifying and providing suggested search queries to a user, according to some embodiments. Alternative embodiments may include more, fewer, or different steps from those illustrated in FIG. 4, and the steps may be performed in a different order from that illustrated in FIG. 4. These steps may be performed by an online concierge system (e.g., the search module 250 of the online concierge system 140). Additionally, each of these steps may be performed automatically by the online concierge system without human intervention.

In step 405, the search ranking module 250 receives 405 a partial search query from a user. The partial search query may be entered character-by-character within a search user interface (e.g., a text box), and so is partial (incomplete) until the last character has been specified.

Matching search queries are identified 410 for the partial search query (e.g., after every character is entered) and considered "candidate" search queries. The matching can be accomplished in different manners in different embodiments and/or contexts, such as a complete or partial (e.g., prefix or substring) literal match, a match of the query to a broader category (e.g., "pineap" falling within the "fruit" category), or the like.

Relevance scores are computed 415 for the various candidate search queries in order to determine how suitable they are for the current user context. As noted above with respect to the contextual relevance computation module 305, contextual relevance may be computed based on a number of different factors, such as the user, the match strength, and/or any implicit search queries.

Additionally, search queries sponsored by third parties are identified 420. This may involve the search module 250 searching the third-party consideration data 310 to determine whether any third parties have specified consideration to be provided for executing any of the candidate search queries. If any sponsored search queries are identified, their consideration values are determined 425, as discussed above with respect to the expected values module 315.

Rankings are computed 430 for the candidate search queries—including any sponsored search queries—as discussed above with respect to the ranking module 320.

Some subset of the candidate search queries (containing a set of the highest-ranking of the candidate search queries) is sent 435 to the client device of the user for display, such as for display within a drop-down menu or other selection menu associated with a textual area in which the partial search query was entered. The user then may click on or otherwise interact with the search queries to cause execution of those queries, which cause the online concierge system 140 to identify content items associated with the search queries and to send those content items to the user's client device. In embodiments in which the expected values module 315 trains a model based on logged statistics for estimating an amount of consideration and/or expected GMV, the expected values module 315 may retrain the model based on which of the candidate search queries the user selected to execute.

In embodiments in which a trained model is used to compute an expected amount of consideration and/or GMV for candidate search queries, the actions of the user in response to the set of highest ranking queries (e.g., the search queries with which the user interacts, the items subsequently purchased after) and related data (e.g., the user identifier, the day and/or time, or the like) may be used as additional features to re-train the model. In this way, the search module 250 learns to better predict user preferences based on observed user behavior.

The operations of FIG. 4 may be performed in other orders in other embodiments, or with some steps performed partially or entirely in parallel. As one example, the determination 425 of expected values of consideration may be performed in an earlier preprocessing phase before step 405.

Although the above-disclosed search scoring and ranking operations have been described as being performed by the search module 250 of FIG. 2, within the context of the online concierge system 140, the operations of the search module 250 may more generally be performed within the context of any system that performs searches for users. As just one example, the same or similar techniques may be applied when providing possible queries within the context of a search engine, or a chat bot, or the like.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method of providing search results, performed at a computer system comprising a processor and a computer-readable medium storing a database of historical search queries provided by one or more users of an online system, the method comprising:

causing presentation of a search interface presented on a client device of a user, wherein the search interface includes an input for inputting a search query;

receiving a partial search query entered into the input of the search interface presented on the client device;

identifying, from the database of historical search queries, a plurality of candidate search queries matching the partial search query, wherein each candidate search query includes all text of the partial search query and additional text not in the partial search query;

generating, for each of the candidate search queries, a contextual relevance score based on whether a user has searched, viewed, or purchased one or more items associated with the candidate search queries;

generating, for each of the candidate search queries, an estimated value of consideration offered by third parties based on consideration obtained by third parties in response to user selection of historical search queries;

adjusting, for each of the candidate search queries and using at least the estimated values of consideration, the contextual relevance scores;

generating a listing of at least a subset of the candidate search queries, the subset of the candidate search queries selected and sorted based on the adjusted contextual relevance scores;

causing the client device of the user to display an updated search interface presenting the generated listing adjacent to the input partial search query;

receiving user input, via the search interface, selecting one of the candidate search queries from the listing;

in response to the user input selecting the one candidate search query from the listing, causing presentation, via the search interface presented on the client device, content items associated with the selected candidate search query;

receiving user input, via the search interface, adding one or more of the content items presented in the search interface to an order for the user, the order identifying one or more content items to be obtained at a retailer location; and transmitting the order identifying the one or more content items to be obtained at the retailer location to another client device associated with a picker, wherein the picker performs collection of the content items at the retailer location.

2. The method of claim 1, further comprising:

generating expected gross merchandise values associated with the candidate search queries; and adjusting, at least in part using the expected gross merchandise values, the contextual relevance scores.

3. The method of claim 1, further comprising:

determining unused amounts of consideration budgets of the third parties for search queries; and generating, at least in part based on the determined unused amounts, the listing of the candidate search queries.

4. The method of claim 1, further comprising:

reducing the listing of the candidate search queries responsive to the candidate search queries containing brand names.

5. The method of claim 1, wherein generating the estimated values comprises applying a trained model to identify the estimated values, the trained model taking as input at least one of: user identifier of the user, day, time, or the partial search query.

6. The method of claim 1, wherein the estimated values of consideration are generated with a machine-learned model, the method further comprising retraining the machine-learned model based on a user selection of one of the plurality of candidate search queries.

7. The method of claim 1, further comprising:

applying, for each candidate search query, an item availability model to predict a likelihood of item availability for each content item associated with the candidate search query; and adjusting further the contextual relevance score for each candidate search query based on the predicted likelihoods of item availability for the one or more content items associated with the candidate search query.

8. A non-transitory computer-readable storage medium storing a database of historical search queries provided by one or more users of an online system and instructions that, when executed by a computer processor, cause the computer processor to perform actions comprising:

causing presentation of a search interface presented on a client device of a user, wherein the search interface includes an input for inputting a search query;

receiving a partial search query entered into the input of the search interface presented on the client device;

identifying, from the database of historical search queries, a plurality of candidate search queries matching the partial search query, wherein each candidate search query includes all text of the partial search query and additional text not in the partial search query;

generating, for each of the candidate search queries, a contextual relevance score based on whether a user has searched, viewed, or purchased one or more items associated with the candidate search queries;

generating, for each of the candidate search queries, an estimated value of consideration offered by third parties based on consideration obtained by third parties in response to user selection of historical search queries;

adjusting, for each of the candidate search queries and using at least the estimated values of consideration, the contextual relevance scores;

generating a listing of at least a subset of the candidate search queries, the subset of the candidate search queries selected and sorted based on the adjusted contextual relevance scores;

causing the client device of the user to display an updated search interface presenting the generated listing adjacent to the input partial search query;

receiving user input, via the search interface, selecting one of the candidate search queries from the listing;

in response to the user input selecting the one candidate search query from the listing, causing presentation, via the search interface presented on the client device, content items associated with the selected candidate search query;

receiving user input, via the search interface, adding one or more of the content items presented in the search interface to an order for the user, the order identifying one or more content items to be obtained at a retailer location; and transmitting the order identifying the one or more content items to be obtained at the retailer location to another client device associated with a picker, wherein the picker performs collection of the content items at the retailer location.

9. The non-transitory computer-readable storage medium of claim 8, the actions further comprising:

generating expected gross merchandise values associated with the candidate search queries; and adjusting, at least in part using the expected gross merchandise values, the contextual relevance scores.

10. The non-transitory computer-readable storage medium of claim 8, the actions further comprising:

determining unused amounts of consideration budgets of the third parties for search queries; and generating, at least in part based on the determined unused amounts, the listing of the candidate search queries.

11. The non-transitory computer-readable storage medium of claim 8, the actions further comprising:

reducing the listing of the candidate search queries responsive to the candidate search queries containing brand names.

12. The non-transitory computer-readable storage medium of claim 8, wherein generating the estimated values comprises applying a trained model to identify the estimated values, the trained model taking as input at least one of: user identifier of the user, day, time, or the partial search query.

13. A computer system comprising:

a computer processor; and a non-transitory computer-readable storage medium storing instructions that when executed by the computer processor perform actions comprising:

causing presentation of a search interface presented on a client device of a user, wherein the search interface includes an input for inputting a search query;

receiving a partial search query entered into the input of the search interface presented on the client device of;

identifying, from a database of historical search queries, a plurality of candidate search queries matching the partial search query, wherein each candidate search query includes all text of the partial search query and additional text not in the partial search query;

generating, for each of the candidate search queries, a contextual relevance score based on whether a user has searched, viewed, or purchased one or more items associated with the candidate search queries;

generating, for each of the candidate search queries, an estimated value of consideration offered by third parties based on consideration obtained by third parties in response to user selection of historical search queries;

adjusting, for each of the candidate search queries and using at least the estimated values of consideration, the contextual relevance scores;

generating a listing of at least a subset of the candidate search queries, the subset of the candidate search queries selected and sorted based on the adjusted contextual relevance scores;

causing the client device of the user to display an updated search interface presenting the generated listing adjacent to the input partial search query;

receiving user input, via the search interface, selecting one of the candidate search queries from the listing;

in response to the user input selecting the one candidate search query from the listing, causing presentation, via the search interface presented on the client device, content items associated with the selected candidate search query;

receiving user input, via the search interface, adding one or more of the content items presented in the search interface to an order for the user, the order identifying one or more content items to be obtained at a retailer location; and transmitting the order identifying the one or more content items to be obtained at the retailer location to another client device associated with a picker, wherein the picker performs collection of the content items at the retailer location.

14. The computer system of claim 13, the actions further comprising:

generating expected gross merchandise values associated with the candidate search queries; and adjusting, at least in part using the expected gross merchandise values, the contextual relevance scores.

15. The computer system of claim 13, the actions further comprising:

determining unused amounts of consideration budgets of the third parties for search queries; and generating, at least in part based on the determined unused amounts, the listing of the candidate search queries.

16. The computer system of claim 13, the actions further comprising:

reducing the listing of the candidate search queries responsive to the candidate search queries containing brand names.

17. The computer system of claim 13, wherein generating the estimated values comprises applying a trained model to identify the estimated values, the trained model taking as input at least one of: user identifier of the user, day, time, or the partial search query.

18. The computer system of claim 13, wherein the estimated values of consideration are generated with a machine-learned model, the actions further comprising retraining the machine-learned model based on a user selection of one of the plurality of candidate search queries.

* * * * *